Nov. 30, 1954     H. ANDERSON     2,695,731

PRECISION REGULATED AIR BLOWGUN

Filed Feb. 11, 1953

INVENTOR.
Henry Anderson
BY
*Sam J. Slotsky*
ATTORNEY

United States Patent Office 2,695,731
Patented Nov. 30, 1954

2,695,731

PRECISION REGULATED AIR BLOWGUN

Henry Anderson, Spencer, Iowa

Application February 11, 1953, Serial No. 336,265

1 Claim. (Cl. 222—3)

My invention relates to a blow gun.

An object of my invention is to provide an air blow gun in which the discharged volume of air can be accurately regulated, so that the air will discharge under precision controlled conditions, so that the discharge will be as small as desired, or as great as desired.

A further object of my invention is to provide a control wherein the control can be left in fixed position, and wherein the control can be effected by the use of the thumb, and in a convenient manner.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1:
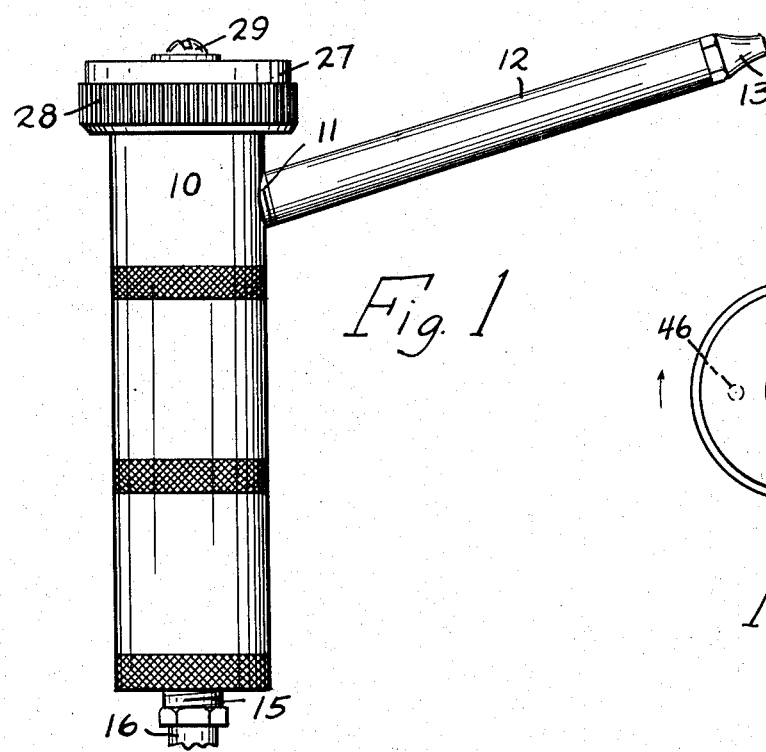
Figure 1 is a side elevation of the blow gun.
Figure 2:
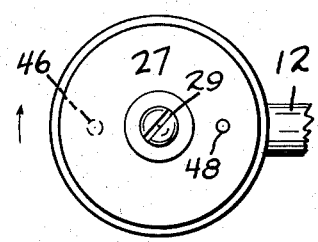
Figure 2 is a plan view of a portion of Figure 1.
Figure 3:
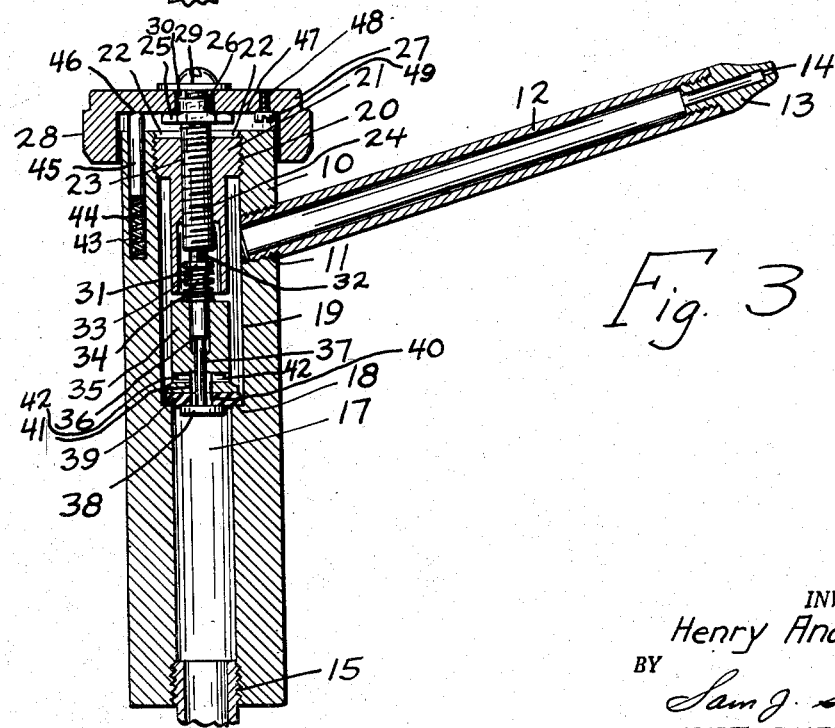
Figure 3 is a sectional view taken substantially along the vertical axis of the blow gun.

My invention contemplates the provision of a blow gun wherein the volume of air emitted can be regulated with precision. This is an important advantage in blow guns since in many cases when the air is otherwise discharged too rapidly, or at too great a volume this air will blow away certain objects, and will cause other disadvantageous effects, and in some cases too low a pressure is also disadvantageous, my invention therefore providing a readily regulated arrangement so that the exact desired pressure can be obtained.

I have used the character 10 to designate the cylindrical handle of the blow gun, and threadably secured at 11 thereto is the discharge pipe 12 terminating in the member 13 threadably attached thereto, the member 13 having the emission opening 14.

Threadably attached at 15 to the lower end of the member 10 is a flexible hose connection 16 which passes to the air supply, such supply being under the usual pressure. The cylindrical member 10 includes the longitudinal cylindrical opening 17 which terminates in an annular shoulder 18, which terminates at the further larger cylindrical opening 19, the opening 19 extending into the threaded portion 20. Threadably engaging the threaded portion 20 is a plug member 21 having the slots 22 whereby the member 21 can be screwed into the threads at 20, and threadably engaging the member 21 at 23 is the threaded stud 24 which includes the integral hexagon portion 25, and extending from the portion 25 is the further cylindrical portion 26. Tightly engaged against the portion 25 is a revoluble cap 27 having the fluted or otherwise roughened periphery 28. The cap is tightly secured to the member 25 by means of a machine screw and washer assembly 29, the screw portion of which passes through the opening 30 in the cap, this screw portion being threadably secured within the stud member 24 as shown.

The member 21 includes the lower cylindrical portion 31 which receives the pin 32 to which is attached a collar 33 which bears against the spring 34, the spring 34 bearing against the top of a further member 35 in which the pin 32 reciprocates at 36, the pin extending into the reduced portion 37 which terminates in the lower circular portion 38. The member 35 firmly bears against a rubber washer 39 having an opening 40 which communicates with the further opening 41 in the member 35, the member 35 including the further openings 42 extending laterally and communicating with the opening 19.

The member 10 includes a deeply recessed opening 43 in which is placed the coil spring 44 which bears against the lower end of the leather cylindrical pin 45, the upper end 46 of which bears against the surface 47 of the cap 27.

Threadably engaged with the member 27 is a machine screw 48 having the downwardly projecting head 49.

The gun operates in the following manner.

It will be noted that the lower end of the stud 24 bears against the upper end of the pin 32. Since the cap 27 is securely attached against the member 25, rotation of the cap 27 will correspondingly rotate the stud 24, it also being noted that the device is assembled so that the cap is spaced slightly above the end of the member 10. Rotation of the cap 27 will thereby depress the pin 32 as well as the portion 38, allowing the air to pass into the openings 40 and 41, and thence through the openings 42, and into the pipe 12 and out of the opening 14. The volume of air will be regulated according to the amount of rotation of the cap 27, this volume being accurately regulated according to the pitch of the thread, so that the amount of air passing through the openings will be very accurately regulated. The cap can rotate nearly a complete turn or until the head 49 of the machine screw 48 strikes against the member 45, the volume of air control thereby being from zero to maximum during nearly one complete turn of the cap. If the cap is turned in a slight arc, only a very minute air pressure will escape etc. The member 45 by exerting pressure at 46 provides a constant brake effect so that the cap can be positioned in any position and retained in this particular position.

It will also be noted that the handle 10 can be grasped by the fingers of the hand and the cap 27 rotated by pressing the thumb against the roughened portions 28. This therefore provides a very convenient arrangement for a precise control of the air pressure and volume, it being apparent that my invention includes a variety of other advantages, and that this device can be used for a variety of purposes, such as cleaning etc.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

An air blow gun comprising a gun body, means for admitting air under pressure into said body, a discharge opening communicating to said body, a valve for releasing said air pressure to said discharge opening, a threaded member threadably engaging said gun body for operating said valve whereby rotation of said threaded member will regulate the air pressure passing into said discharge opening, a rotatable cap locked to said threaded member for operating said threaded member, said valve including a pin having a lower expanded portion, a resilient washer having an opening receiving said pin, said expanded portion being seated against said washer when said valve is closed, spring means for normally urging said pin upwardly, the lower end of said threaded member bearing against the upper end of said pin, said valve including a valve body in which said pin slides, said valve body having openings communicating to said discharge opening, said gun body having an insert with which said threaded member is threadably engaged, said gun body including a spring-urged friction member engaging a portion of said cap to provide a braking action against said cap, a stop member attached to said cap adapted to contact said friction member to limit rotation of said cap.

References Cited in the file of this patent

UNITED STATES PATENTS

| Number | Name | Date |
|---|---|---|
| 1,625,044 | McKeown | Apr. 19, 1927 |
| 2,363,521 | Grant, Jr. | Nov. 28, 1944 |
| 2,562,111 | Michel | July 24, 1951 |
| 2,586,575 | Syme | Feb. 19, 1952 |

FOREIGN PATENTS

| Number | Country | Date |
|---|---|---|
| 152,321 | Germany | June 16, 1904 |
| 377,152 | France | July 2, 1907 |
| 320,442 | Italy | Aug. 21, 1934 |